US009189377B1

(12) United States Patent  
Arkadyev

(10) Patent No.: US 9,189,377 B1  
(45) Date of Patent: Nov. 17, 2015

(54) AUTOMATION TESTING USING DESCRIPTIVE MAPS

(71) Applicant: Bank of America Corporation, Charlotte, NC (US)

(72) Inventor: Alexander Arkadyev, Thornhill (CA)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/462,540

(22) Filed: Aug. 18, 2014

Related U.S. Application Data

(60) Provisional application No. 62/006,777, filed on Jun. 2, 2014.

(51) Int. Cl.
*G06F 9/44* (2006.01)
*G06F 11/36* (2006.01)

(52) U.S. Cl.
CPC .................................. *G06F 11/3688* (2013.01)

(58) Field of Classification Search
None
See application file for complete search history.

(56) References Cited

U.S. PATENT DOCUMENTS

| | | | |
|---|---|---|---|
| 6,070,152 A | 5/2000 | Carey et al. | |
| 6,564,342 B2 * | 5/2003 | Landan | 714/48 |
| 6,701,325 B2 | 3/2004 | Langkafel et al. | |
| 6,823,495 B1 | 11/2004 | Vedula et al. | |
| 6,854,089 B1 | 2/2005 | Santee et al. | |
| 7,100,195 B1 * | 8/2006 | Underwood | 726/2 |
| 7,930,343 B2 | 4/2011 | Zhang et al. | |
| 7,958,495 B2 | 6/2011 | Kelso | |
| 8,117,218 B2 | 2/2012 | Dam | |
| 8,677,320 B2 | 3/2014 | Wilson et al. | |
| 2007/0220341 A1 | 9/2007 | Apostoloiu et al. | |
| 2010/0241518 A1 * | 9/2010 | McCann | 705/17 |
| 2011/0123973 A1 | 5/2011 | Singh | |
| 2011/0283148 A1 | 11/2011 | Rossi | |
| 2011/0289489 A1 * | 11/2011 | Kumar et al. | 717/135 |
| 2012/0204091 A1 | 8/2012 | Sullivan et al. | |
| 2013/0138495 A1 * | 5/2013 | Lemphers et al. | 705/14.26 |
| 2013/0219307 A1 * | 8/2013 | Raber et al. | 715/763 |
| 2014/0032637 A1 | 1/2014 | Weir | |
| 2014/0229920 A1 * | 8/2014 | Rossi | 717/125 |

OTHER PUBLICATIONS

"HP QuickTest Professional," Wikipedia.org, Aug. 14, 2014.

* cited by examiner

*Primary Examiner* — Chameli Das
(74) *Attorney, Agent, or Firm* — Weiss & Arons LLP; Michael A. Springs, Esq.

(57) ABSTRACT

Apparatus and methods for automation testing of a user interface ("UI") using descriptive UI Maps are provided. A UI Map may list related UI controls, properties and functionality of the UI controls. A Data Sheet may provide test parameters used for each control in a particular test step. An Instructions Sheet may specify an automation test scenario to be applied. The Instruction Sheet may include a reference to the test parameters of the Data Sheet. Use of descriptive UI maps may provide a modular framework. Each UI Map may describe a group of functionally or logically linked controls on a UI page. As a result of description details being provided in the UI map, standard code may be written once to interpret and make use of those details. Typically no additional coding is required to automate test scenarios related to control groups associated with the UI.

11 Claims, 9 Drawing Sheets

UIMAP FOR WEBTABLE

| KEY | BROWSER | PAGE | FRAME | CONTROL | CONTROLTYPE | DEFAULTVALUE | CATEGORY | INFO | INFO2 | LOOKFOR |
|---|---|---|---|---|---|---|---|---|---|---|
| UINAME | | | | | | | A | UI_DESCRIPTION | | |
| ORPATHS | | | | | | | A | OR_RELATIVE_PATH | | |
| SETTINGS | | | | | | | A | REPLAY_TYPE | | |
| VISIBILITY HELPER | | | | | | | A | VISIBILITY_HELPER_NAME | VERIFICATION_COLUMN | |
| TABLE | BROWSER_NAME | PAGE_NAME | FRAME_NAME | CONTROL_NAME | WEBTABLE | | CATEGORY | FIRST_CONTENT_ROW | | |
| COLUMN_KEY | | | | | | | CATEGORY | COLUMN_NUMBER | | |
| CONTROL_KEY | BROWSER_NAME | PAGE_NAME | FRAME_NAME | CONTROL_NAME | CONTROL_TYPE | DEFAULT_VALUE | CATEGORY | ADDITIONAL_INFO | ADDITIONAL_INFO2 | CONTROL_KEY/WAIT_TIME;UIMAP_KEY/WAIT_TIME |
| TEL_KEY | | | | | TE1;TE2,... | | A | | | |
| TE_KEY | | | | | CONTROL_TYPE | DEFAULT_VALUE | A | IDENTICATION-PROPERTIES | | CONTROL_KEY/WAIT_TIME;UIMAP_KEY/WAIT_TIME |
| UIMAP_KEY | | | | | | | A | UIMAP_NAME | | |
| REF_UIMAP | | | | | | | A | UIMAP_NAME | | |

FIG. 4

| CONTROL/ OBJECT TYPE | STATE OPTIONS | VALUE OPTIONS | COMMENT |
|---|---|---|---|
| CHECK BOX | EXIST/ NOTEXIST/ ENABLED/DISABLED | ON | THE CONTROL IS CHECKED |
| | | OFF | THE CONTROL IS UNCHECKED |
| WEBEDIT | EXIST/NOTEXIST/ ENABLED/DISABLED | VALUE | THE CONTROL VALUE WILL BE VERIFIED IF PROVIDED |
| WEBRADIO GROUP | EXIST/ NOTEXIST/ ENABLED/DISABLED | SELECTED ITEM | CURRENTLY SELECTED ITEM WILL BE VERIFIED |
| | | ALL ITEMS; ITEM1;ITEM2;... | ALL ITEMS IN THE CONTROL WILL BE VERIFIED AGAINST THE PROVIDED LIST OF VALUES |
| WEBLIST | EXIST/NOTEXIST/ ENABLED/DISABLED | SELECTED ITEM | CURRENTLY SELECTED ITEM WILL BE VERIFIED ALL THE ITEMS LISTED SHOULD EXACTLY MATCH WITH ITEMS IN APPLICATION. ADDITIONAL ITEMS ARE NOT ALLOWED. |
| | | ITEM1;ITEM2;... | ALL THE ITEMS LISTED SHOULD EXACTLY WITH ITEMS IN APPLICATION. ADDITIONAL ITEMS ARE ALLOWED. |
| | | ALL ITEMS; ITEM1;ITEM2;... | ALL THE ITEMS LISTED SHOULD EXACTLY WITH ITEMS IN APPLICATION. ADDITIONAL ITEMS ARE ALLOWED. |
| WEB ELEMENT | EXIST/NOTEXIST/ ENABLED/DISABLED | VALUE | THE BELOW SPECIAL CASES ARE SUPPORTED: |
| | | MSGID | |
| | | RANGE: FROM; TO | |
| WEB BUTTON | EXIST/NOTEXIST/ ENABLED/DISABLED | VALUE | |
| WEBIMAGE | EXIST/NOTEXIST/ ENABLED/DISABLED | N/A | |
| WEBTABLE | EXIST/NOTEXIST | N/A | |
| LINK | EXIST/NOTEXIST/ ENABLED/DISABLED | VALUE | THE CONTROL VALUE WILL BE VERIFIED IF PROVIDED |
| NON-POPUP UIMAP | EXIST/NOTEXIST | N/A | THIS VERIFICATION IS NEEDED IN LOOKFOR CONTEXT, ALLOW POINTING TO SOME DATA ROW, ENABLING REQUIRED PROCESSING IN THE SAME STEP. |
| POPUP UIMAP | EXIST/NOTEXIST | KEEP | THIS VERIFICATION IS BEING PERFORMED IN LOOKFOR CONTEXT "KEEP" VALUE SHOULD BE PROVIDED TO ALLOW USING THE POPUP IN THE NEXT STEP. OTHERWISE THE POPUP WILL BE CLOSED AUTOMATICALLY |

FIG. 5

| | Account Number | Account Name | Check Number | Amount | Paid Date | Status | Return Reason |
|---|---|---|---|---|---|---|---|
| | | | | | | All Statuses ▷ | Choose Action ▷ |
| ☐ ⊞ | 000001234567 | ACCNT 123 | 1 | 1.00 | 05/29/2014 | Pending Approval | Return-Fraud |
| ☐ ⊞ | 000001234567 | ACCNT 123 | 2 | 2.00 | 05/29/2014 | Pending Confirmation | Return-Refer to Maker |
| ☐ ⊞ | 000001234567 | ACCNT 123 | 3 | 3.00 | 05/29/2014 | Pending Confirmation | Return-Fraud |
| ☐ ⊞ | 000001234567 | ACCNT 123 | 4 | 4.00 | 05/29/2014 | Pending Confirmation | Return-Fraud |
| ☐ ⊞ | 000001234567 | ACCNT 123 | 5 | 5.00 | 05/29/2014 | Pending Confirmation | Return-Fraud |
| ☐ ⊞ | 000001234567 | ACCNT 123 | 6 | 6.00 | 05/29/2014 | Paid | Choose Action ▷ |
| ☐ ⊞ | 000001234567 | ACCNT 123 | 7 | 7.00 | 05/29/2014 | Paid | Choose Action ▷ |
| ☐ ⊞ | 000001234567 | ACCNT 123 | 8 | 8.00 | 05/29/2014 | Paid | Choose Action ▷ |
| ☐ ⊞ | 000001234567 | ACCNT 123 | 9 | 9.00 | 05/29/2014 | Paid | Choose Action ▷ |
| ☐ ⊞ | 000001234567 | ACCNT 123 | 10 | 10.00 | 05/29/2014 | Paid | Choose Action ▷ |
| ☐ ⊞ | 000001234567 | ACCNT 123 | 11 | 11.00 | 05/29/2014 | Paid | Choose Action ▷ |
| ☐ ⊞ | 000001234567 | ACCNT 123 | 12 | 111.00 | 05/29/2014 | Paid | Choose Action ▷ |
| ☐ ⊞ | 000001234567 | ACCNT 123 | 13 | 121.00 | 05/29/2014 | Paid | Choose Action ▷ |
| ☐ ⊞ | 000001234567 | ACCNT 123 | 14 | 131.00 | 05/29/2014 | Paid | Choose Action ▷ |
| ☐ ⊞ | 000001234567 | ACCNT 123 | 15 | 141.00 | 05/29/2014 | Paid | Choose Action ▷ |
| ☐ ⊞ | 000001234567 | ACCNT 123 | 16 | 151.00 | 05/29/2014 | Paid | Choose Action ▷ |
| ☐ ⊞ | 000001234567 | ACCNT 123 | 17 | 161.00 | 05/29/2014 | Paid | Choose Action ▷ |
| ☐ ⊞ | 000001234567 | ACCNT 123 | 18 | 171.00 | 05/29/2014 | Paid | Choose Action ▷ |
| ☐ ⊞ | 000001234567 | ACCNT 123 | 19 | 181.00 | 05/29/2014 | Paid | Choose Action ▷ |

▼ Filter Results | New Search | View Requested Paid Items        Clear Filters | ◯ | 75 Records (0 records selected)        Last Updated 05/30/2014 04:19 PM CDT

FIG. 6A

| Keys | Browser | Page | Control | Control Type | Default Value | Category | Info | Info2 | LookFor |
|---|---|---|---|---|---|---|---|---|---|
| UIMap example for webtable (UIMaps/RRP_webtable.xls) | | | | | | | | | |
| UIName | | | | | | A | RPP_Exception_List | | |
| ORPaths | | | | | | A | CRS/Object Repository/CheckServices/Rewrite.tsr | | |
| Settings | | | | | | A | Replay type=Event | | |
| Visibility_Helper | | | | | | A | Positive,X,Y | | 3 |
| Table | CPO_CSR | RRP_SearchResult | SearchResult | WebTable | | D | | 1 | |
| SelectRow_Col | | | | | | A:S | | 1 | |
| ExpandRow_Col | | | | | | A:S | | 2 | |
| AccountNumber_Col | | | | | | A:S | | 3 | |
| AccountName_Col | | | | | | A:S | | 4 | |
| CheckNumber_Col | | | | | | A:S | | 5 | |
| Amount_Col | | | | | | A:S | | 6 | |
| PaidDate_Col | | | | | | A:S | | 7 | |
| Status_Col | | | | | | A:S | | 8 | |
| ReturnReason_Col | | | | | | A:S | | 9 | |
| SelectRow_SelectAll | CPO_CSR | RRP_SearchResult | SelectRow_SelectAll | WebCheckBox | | S | | | |
| ExpandRow_ExpandAll | CPO_CSR | RRP_SearchResult | ExpandRow_ExpandAll | WebElement | | D | | | |
| ExpandRow_CollapseAll | CPO_CSR | RRP_SearchResult | ExpandRow_CollapseAll | WebElement | | D | | | |
| ReturnReason_FillSelected | CPO_CSR | RRP_SearchResult | ReturnReason_FillSelected | WebElement | ChooseActi | S | | SelectSendKeys | Table,MEDIUM_WAIT |
| ClearFilters | CPO_CSR | RRP_SearchResult | ClearFilters | WebEdit | | S | | | NoRecordsMatchYourCriteria... |
| AccountNumber_Filter | CPO_CSR | RRP_SearchResult | AccountNumber_Filter | WebEdit | BLANK | S | BeginsWith | TypeStr2 | NoRecordsMatchYourCriteria... |
| AccountName_Filter | CPO_CSR | RRP_SearchResult | AccountName_Filter | WebEdit | BLANK | S | BeginsWith | TypeStr2 | NoRecordsMatchYourCriteria... |
| CheckNumber_Filter | CPO_CSR | RRP_SearchResult | CheckNumber_Filter | WebEdit | BLANK | S | BeginsWith | TypeStr2 | NoRecordsMatchYourCriteria... |
| Amount_Filter | CPO_CSR | RRP_SearchResult | Amount_Filter | WebEdit | BLANK | S | BeginsWith | SetNullValue | NoRecordsMatchYourCriteria... |
| PaidDate_Filter | CPO_CSR | RRP_SearchResult | PaidDate_Filter | WebEdit | BLANK | S | | TypeOut3 | NoRecordsMatchYourCriteria... |
| Status_Filter | CPO_CSR | RRP_SearchResult | Status_Filter | WebEdit | All Statuses | S | Exact | | |
| AccountNumber_Sort | CPO_CSR | RRP_SearchResult | AccountNumber_Sort | Link | | S | | | |
| AccountName_Sort | CPO_CSR | RRP_SearchResult | AccountName_Sort | Link | | S | | | |
| CheckNumber_Sort | CPO_CSR | RRP_SearchResult | CheckNumber_Sort | Link | | S | | | |
| Amount_Sort | CPO_CSR | RRP_SearchResult | Amount_Sort | Link | | S | | | |
| PaidDate_Sort | CPO_CSR | RRP_SearchResult | PaidDate_Sort | Link | | S | Asc=Pending Confirmation,Confirmed,Pending Approval,Paid;Desc=Paid,Pending Approval,Confirmed,Pending | | |
| Status_Sort | CPO_CSR | RRP_SearchResult | Status_Sort | WebElement | | S | | | |
| ReturnReason_Sort | CPO_CSR | RRP_SearchResult | ReturnReason_Sort | WebElement | | S:C | | | |
| AccountNumber_SortAsc | CPO_CSR | RRP_SearchResult | AccountNumber_SortAsc | Image | | D | | | |
| AccountName_SortAsc | CPO_CSR | RRP_SearchResult | AccountName_SortAsc | Image | | D | | | |

Instructions (709, table 701):

| Action | Test ID | Input | Options | Expected Results |
|---|---|---|---|---|
| UITable.Filter | | RPP;FilterAndVerify | | Action Success |
| UITable.VerifyFilter | | RPP;VerifyFilter | | Action Success |
| UITable.ActTE | | RPP;Click_CheckNumber | | Action Success |

Data table (711, table 703), columns 713, 715:

| Comment | Label | UIMapName | Row | ClearFilters | CheckNumber_Filter | CheckNumber_TE |
|---|---|---|---|---|---|---|
| Filter | FilterAndVerify | UIMap_RRP | !IGNORE! | Click | %CheckNumber%;Verify | IGNORE! |
| Act TE | Click_CheckNumber | UIMap_RRP | 1 | Click | %CheckNumber% | Click |
| VerifyFilter | VerifyFilter | UIMap_RRP | !IGNORE! | !IGNORE! | %CheckNumber% | IGNORE! |

FIG. 8

Instructions (809, table 801):

| Action | Test ID | Input | Options | Expected Results |
|---|---|---|---|---|
| UITable.Sort | | SRSort;SortAsc | | Action Success |
| UITable.Verify Sort | | SRSort;SortAsc | | Action Success |
| UITable.Sort | | SRSort;SortDesc | | Action Success |
| UITable.Verify Sort | | SRSort;SortDesc | | Action Success |

Data table (807, table 803), columns 816, 817, 819, 821, 823 (rows 813, 815):

| Comment | Label | UIMapName | AccountNumber_Sort | AccountName_Sort | CheckNumber_Sort | Amount_Sort |
|---|---|---|---|---|---|---|
| Sort/VerifySort | SortAsc | UIMap_RRP | Asc;Verify;Amount;Asc | Asc;Verify_All | Asc;Verify_10 | Asc |
| Sort/VerifySort | SortAsc | UIMap_RRP | Desc;Verify;Amount;Asc | Desc;Verify_All | Desc;Verify_10 | Desc |

AUTOMATION TESTING USING DESCRIPTIVE MAPS

CROSS-REFERENCE TO RELATED APPLICATION

This application is a nonprovisional of U.S. Provisional Application No. 62/006,777, filed on Jun. 2, 2014, which is hereby incorporated by reference herein in its entirety.

FIELD OF TECHNOLOGY

Aspects of the invention relate to automation testing of user interfaces.

BACKGROUND

Computer code that implements a user interface ("UI") may include automation processes. An automation process may be triggered by a user action. For example, in response to a user selection, the code may display additional options for user selection. A UI may include a plurality of controls to provide user functionality. For example, a UI may include a web button, that when selected by a user, performs an action responsive to the user selection. A UI control may display a popup window in response to the user selection.

Computer code implementing a UI should be tested before the UI is deployed. Using automation testing a UI maybe testing against real-life scenarios that may be experienced by a user. Automation testing may verify that the UI performs as designed and as expected. Automation testing may include verifying that the UI presents information to a user that the user expects, is relevant to the user and is responsive to the user's action. Testing performed on automation code may include confirming that institutional coding guidelines have been followed and identifying discrepancies between UI implementation and UI design specifications.

Over the years, test automation tools and processes have matured to simplify the process of developing test automation and creating reliable test scripts that simulate user triggers. The automation testing progress has gone through several stages. Automation testing began with "Record and Playback" and now has reached a fifth generation stage termed "Advanced Codeless Test Automation." However, even the current approaches to automation testing typically operate on individual controls as opposed to operating on a group of controls. Current approaches also do not have an ability to easily "scale up" and test a UI that includes a high density of automation controls.

Furthermore, current approaches have been unable to efficiently test table related controls. Tables typically include automation functionality such as filtering and sorting of various columns, searching for rows based on their content, verifying table/rows/cells content, editing table elements and row selection, expansion or deletion. Automating testing of each of these table controls typically involves laborious coding tasks.

Thus, using currently available tools, implementing automation testing in a robust and scalable way involves significant amount of coding and requires automation testers with strong software development skills. This disclosure provides apparatus and methods for robust and scalable automation testing, in a modular way, that involve minimal or no coding.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows illustrative components in accordance with principles of the invention;

FIG. 5 shows illustrative information in accordance with principles of the invention;

FIGS. 6A and 6B show illustrative components in accordance with principles of the invention;

FIG. 7 shows illustrative components in accordance with principles of the invention;

FIG. 8 shows illustrative components in accordance with principles of the invention.

DETAILED DESCRIPTION OF THE DISCLOSURE

Figure 1:
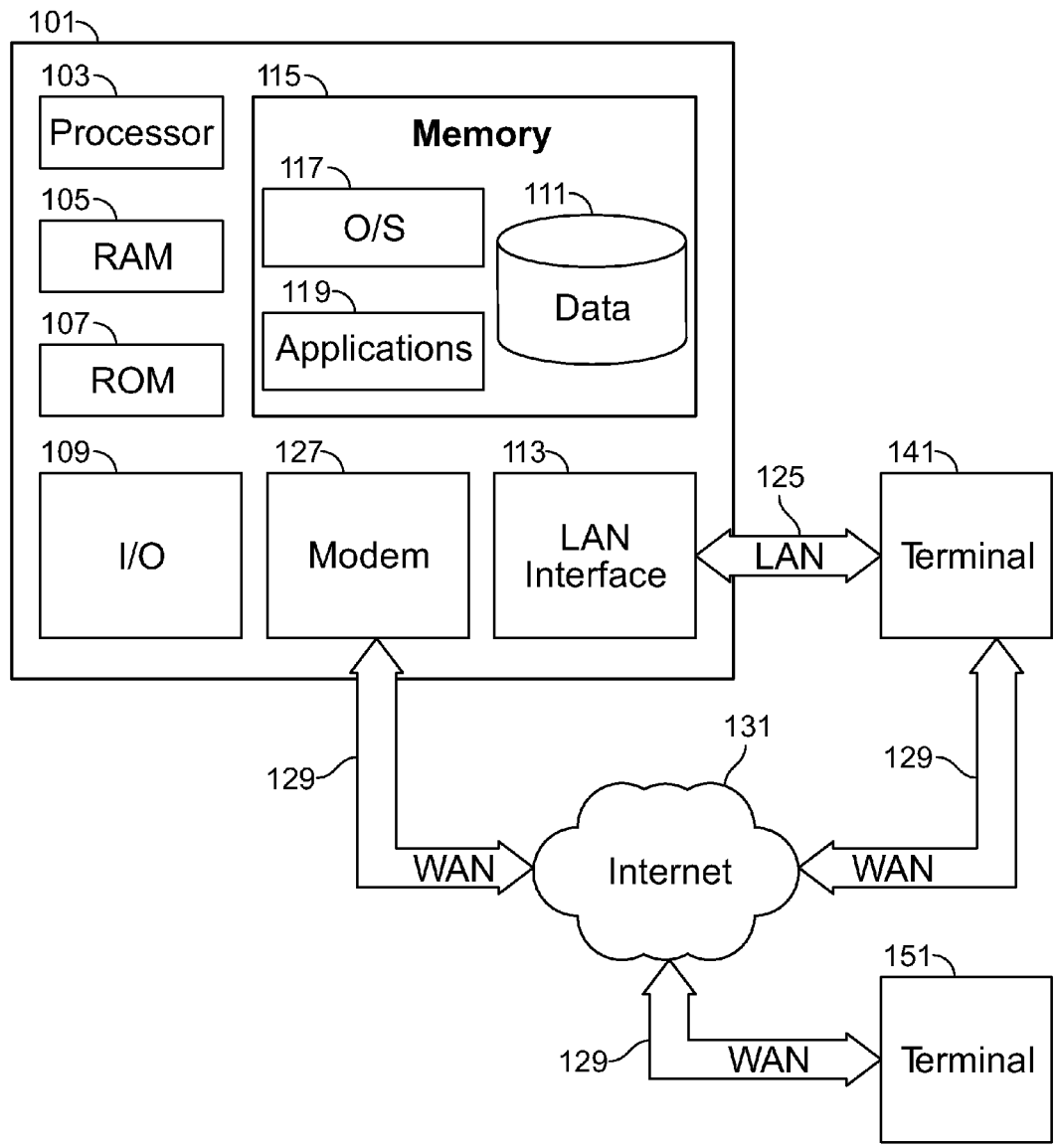
FIG. 1 shows an illustrative apparatus in accordance with principles of the invention.

The current disclosure is directed to automation testing. The current disclosure uses UI applications as an example of software that may be tested using apparatus and methods disclosed herein. Although discussed in the context of UIs, apparatus and methods for automation testing disclosed herein may be applied to other computer program products.

Apparatus and methods may include creating a UI Map as a basis for one or more automation testing scripts. An automation testing script may include computer code that mimics a human user's input, or other scenario, with respect to an application-under-test (hereinafter, "AUT"). An automation testing script may monitor a response of the AUT to a test scenario. The automation testing script may monitor an expected response of the AUT to a test inputs.

A UI Map may include a "blueprint" of a computer application such as a UI. The UI Map may list controls included in the UI. The UI Map may include properties of controls used to implement the UI and relationships between various controls. A UI Map may be constructed based on a logical flow of an algorithm implemented by the UI.

A computer programmer, or a team of programmers, may design a UI by creating a design document. The design document may describe a logical flow of one or more functions of the UI. The design document may describe controls that may be deployed within the UI to implement the desired functionality.

A control may implement a functionality of the UI. User selection of a control may trigger a computational action, may open a pop-up window, may sort a list or may prompt a user for a further action.

A design document may be required to conform to predetermined coding guidelines. Based on the design documents, an automation tester may create a UI Map. In some embodiments, computer code may parse a design document and extract information needed to construct a UI Map. Creating the UI Map may include extracting information from the UI design documents. In some embodiments, the extractions may be automated. In some embodiments, creation of a UI Map may be automated.

A UI Map may be created as soon as the UI design documents are available. The UI design documents may be available before code is written to implement the UI. Thus, production of test automation code may begin before the AUT is accessible.

Apparatus and method may allow for "first pass automation testing." A UI Map that is created based on the design documents may be utilized to identify discrepancies between the UI as described in the design documents and an actual implementation of the UI. The UI Map may be created based on the design documents and the UI Map may be used to generate automation testing scenarios. The generated testing scenarios may be applied to an actual implementation of the UI.

The actual implementation of the UI may differ from the design documents. Because the UI Map and automation testing scenarios are generated based on the design document, applying the automation testing scenarios to the UI, as implemented, may detect discrepancies between the design documents an UI, as implemented. A primary goal of automation testing may include detecting such discrepancies.

A UI Map may describe a UI control and/or plurality of controls. The UI Map may include properties and functions of the control. A UI Map may describe one or more properties of a UI control. The UI Map may include one or more properties of more than one UI control.

For example, for a control, the UI Map may include the following properties of the control:
  Is the control dynamic or static?
  What control(s) may be used to identify a UI webpage?
  What control(s) may represent messages, labels, or other UI functionalities?
  Default values of the controls (if any).

A UI Map may include relationships between various controls utilized by the UI. Such relationships may support automation testing of scenarios involving UI synchronization. For example, utilizing a UI Map, an AUT may be tested for the following illustrative scenarios:
  "If the user clicks on some button, what message, what popup, what other page is expected and how long should the user wait for the follow-up action to occur?"
  "May other controls appear depending on the user selection?"
  "If a user 'mouses' over some control, is a tooltip expected?"

A UI may include a control that performs a special function. The UI Map may include the controls with special functions. Illustrative special function controls may include table related controls that perform functions such as filtering, sorting and selecting. Illustrative special function controls may include default controls to handle popups.

The UI Map may group related controls within a UI. A distinct UI Map may be created for each group of related controls. UI controls may be related because each control in the group shares a property. For example, a group of controls may be related if each member of the group is designed to be presented to a user the same webpage. Controls may be related if the controls are designed to be presented to a user as a group. UI controls may be related as a result of each of a plurality of UI controls being displayed to a user as a result of prior user selections.

UI controls may be related logically, functionally and/or geographically. In a preferred embodiment, each UI Map groups controls that are designed to appear concurrently on a UI page. The grouping of UI controls may be used to identify a page of a web-based UI. A UI page may be identified based on the UI controls designed to be part of the page.

Analysis of a UI design document may establish relationships between UI controls and UI functionality. For example, if, within a UI, a user clicks on a displayed button, what responsive action is expected to occur as a result of the user click. The responsive action may include displaying a message, popup, or other page. Testing of an AUT may include determining how long the user is expected to wait before the AUT takes action in response to the user input.

A UI Map may identify controls that may appear in response to user action or input. For example, as discussed above, the UI Map may indicate whether a tooltip is expected to be displayed when the user "mouses" over a control.

A plurality of UI Maps may be created based on a UI design schematic. For example, in web-based UIs, each UI Map may describe a webpage or a group of functionally or logically linked controls on a webpage. Each UI Map may form a module for an automation testing script. Utilizing a UI Map based approach to automation testing may provide a modular automation testing system.

Each UI Map may describe a UI webpage or a group of functionally or logically linked controls available on a UI webpage. A UI Map may link to other UI Maps.

The UI Map may be constructed using properties described in the design documents for an AUT. The properties of a control, as described in associated design documentation, may be tested using techniques disclosed herein.

Standard code, written once to interpret a first UI Map may be used to interpret other UI Maps. Preferably, once an application is mapped, no additional coding is required to apply previously coded automation test scenarios to an AUT or controls groups described in UI Maps associated with the AUT.

A modular approach to automation testing using UI Maps may increase productivity of automation testers. Productive development of testing scripts may begin as soon as program specifications/design documents are available. Reliance on UI Maps generated directly from UI design documentation may allow automation testers to create testing scripts earlier in the testing cycle and perform "first pass automation testing" based on the design specifications as soon as a usable version of a UI or other AUT is available.

A modular approach to automation testing may reduce maintenance needed when changes occur to a UI design. After a change is made to a UI design, an automation testing script may be easily updated by changing an entry in a UI Map—no changes to code that implements an automation test scenario are needed.

Each UI Map may be associated with a Data Sheet. The Data Sheet may include an automation test that is to be performed for one or more controls included in a UI Map. For example, a Data Sheet may include a plurality of rows and a plurality of columns. Each row may correspond to an automation test that is to be performed for each of the controls listed in the plurality of columns.

Each automation test listed in the Data Sheet may test a designed functionality of the AUT. Each automation test may simulate a user action and test a behavior of the controls in response to the simulated user action.

For each control/test combination included in a UI Map, the Data Sheet may include a test parameter that is utilized by an automation test scenario. The test parameters may be listed in a cell (intersection of row/column) corresponding to a particular automation test (Data Sheet row) applied to a particular control (Data Sheet column).

An exemplary test parameter may be a default value for a control. The default value is used as a test input to an automation test. A default value may be a property exhibited by a control when the control is initialized. For example, upon initialization of a webpage, a drop down list control included on the page may be displayed with a commonly selected default value. If a webpage includes "OK" or "Cancel" web buttons, the "Cancel" option may be selected upon initialization of the webpage.

A test parameter included in the Data Sheet may be a function call. For example, some controls, such as a web button, may be displayed within a UI for user selection. The default test parameter for the web button may include a reference or pointer to a function call.

An exemplary function call may verify that a control is in fact displayed ("exists") when the UI is initialized. An automation test may determine whether controls are displayed when a UI is initialized—i.e., is a "submit" web button is displayed to the user when a form is presented to the user. An automation test may verify that a UI performs as designed in response to user input—i.e., when the user clicks the "submit" button, verify that information selected by the user is transmitted or displayed as specified in the UI design documents.

Each UI Map may be associated with an Instruction Sheet. The Instruction Sheet may include a reference to the Data Sheet. The Instruction Sheet may specify automation test scenarios that are to be used to test controls listed in the UI Map. Each automation test scenario may rely on the test input parameters specified in the Data Sheet for each control that is tested under the scenario. The Instruction Sheet may be a table. Each row of the Instruction Sheet may correspond to an automation test that is to be applied to one or more controls included in the UI Map.

A column of the Instruction Sheet may specify an action or automation test scenario to be performed. The column may include a keyword entry that initializes creation of a UI Map class object. For example, the column of the Instruction Sheet may include the "UIMap.Verify" keyword.

The name of the UI Map class object to be built is extracted from an entry in the Data Sheet using a predefined "UIMap-Name" key. The Data Sheet may include a column labeled "UIMapName." Cells of the Data Sheet within the "UIMap-Name" column may include data corresponding to the name of the UI Map class to be built. The name of the UI Map class may correspond to a label assigned to a UI Map. The name of the UI Map class may describe a group of related controls that are described in the UI Map. The name of the UI Map class may describe a function of a group of related controls.

The illustrative "Verify" function is invoked for the created UI Map class. The Instruction Sheet may specify one or more inputs to the Verify function. The one or more inputs may be obtained from data stored in the Data Sheet. The "Verify" function may iterate through controls included in the UI Map, extract a corresponding test parameter (referenced in the Data Sheet) and call computer code to perform the required automation test. In this case, the "Verify" function may determine whether a control listed in a UI Map is properly initialized when a UI webpage is loaded.

Other illustrative automation tests included in an Instruction Sheet may include "UIMap.Fill," "UIMap.Act" and "UIMap.Process."

The "Fill" function enters or selects values for single or multiple data entry controls (like edit box, check box, dropdown list, etc.) and verifies possible results of the user selection. For example, when a user selects an option in a checkbox, the user selection may trigger a presentation of another control or a group of controls. The Fill function may simulate the user selection. As a further example, a smart form message indicating success or failure may be shown after entering a control value. The Fill function may simulate the entry of the control value.

The "Act" function performs an action on a single command control (e.g., simulates a clicking of a Button) and verifies possible results of the action. For example, the Act function may determine whether a user is properly navigated to another page is response to the action, or does a popup or other message appear in response to taking the action.

The "Process" function is a combination of "Fill" and "Act" functions performed in a sequence. First, all data entry controls are filled. Then, a prescribed action is performed on a single command control, if any is specified.

A function call implementing an automation test may be coded before design documents for a UI are released. The function may be pre-coded as a result of an automation test being commonly applied to a UI or other AUT. The function may be pre-coded as a result any suitable theory or UI design consideration. Commonly used automation test functions may be reused across different UIs.

An Instruction Sheet may include a column that identifies input information for an automation test. The input information may identify where the automation test function call may find test parameters for the automation test. The input information may be stored in a cell of the Data Sheet. Each cell on the Data Sheet may include a test parameter for a particular control and automation test.

For each automation test applied to controls listed in a UI Map, the Instruction Sheet may specify an expected result of the automation test. For example, the Instruction Sheet may specify that a control of the AUT is verified when an automation test listed in the Instruction Sheet succeeds or fails. If a result of the automation test conforms to the expected result, the tested controls may be verified as being compliant with a design specification of the AUT.

Performing automation testing utilizing a UI Map framework provides support for using automation testing scenarios and input parameters across multiple testing steps, multiple controls and/or multiple UIs.

For example, a testing parameter % VariableName % may be utilized across a plurality of UI Maps. The testing parameter % VariableName % may be a function that performs a specific task for a control. For example, % VariableName % may correspond to a function that checks a range of check numbers a user is authorized to view.

The UI Map framework provides support for utilizing generators to produce numbers and/or dates as testing input parameters. For example, testing parameters such as "$Num__8$, $Num__12$" may generate unique numbers of a specified length. As a further example, testing parameters such as "$Date-5$, $Date+2$" may generate past and future dates. Each of the generators may be used by multiple testing scenarios across multiple UI Maps.

The UI Map framework provides support for utilizing Message Lists. Message Lists provide a centralized facility for storing messages that may be presented to a user by a UI. A Message List may store an exact message and a regular expression representing a message. An "exact message" is stored in the Message List exactly like it will be shown in the UI. A "regular expression" is a sequence of characters that forms a search pattern, mainly for use in pattern matching with strings.

A regular expression is typically shorter than the exact message, and allows identifying a message in a more robust way. For example, if a final period character is missing in the message on the UI, an exact match would fail while a regular expression match would be successful. An AUT may pass an automation test if the message test corresponds to a "regular expression."

The Message List may support resolution of dynamic tags included within a message body. The Message List may allow runtime message extraction by passing a MsgID to a function. For example, a testing parameter may reference the exemplary expression "Msg_MLKey_MsgKey." The Message List may store a message text in a table indexed by the MsgKey and locate the appropriate message in the Message List corresponding to the MsgKey.

Apparatus may include an article of manufacture. The manufacture may include a non-transitory computer usable medium. The non-transitory medium may have computer readable program code embodied therein. The code, when executed by one or more processors, may configure a computer to execute a method for automation testing of a webpage of a User Interface ("UI"). The method may include receiving an Instruction Sheet. The instruction sheet may provide steps to implement an automation test scenario.

For example, an automation test scenario may include filtering and/or sorting rows of a table of the UI. The automation test scenario may include evaluating whether the table is correctly displayed after the filtering and/or sorting. The automation test scenario may include manipulating a control on webpage of the UI and evaluating a response of the control to the manipulation. The Instruction Sheet may include a reference to one or more function calls that implement at a portion of the automation test scenario. The methods may include executing the one or more function calls and implementing the automation test scenario.

The Instruction sheet may include a reference to a Data Sheet. For each automation test scenario included in the Instruction Sheet, the Data Sheet may detail how one or more UI controls interact during an automation test scenario. For each automation test scenario included in the Instruction Sheet, the Data Sheet may include testing parameters for each control tested by one or more automation test scenarios included in the Instruction Sheet. A testing parameter may be an input used to manipulate the UI control. A testing parameter may a reference to metadata stored in a UI Map.

The testing parameter may be a mouse click or any suitable action for manipulating a UI control. For example, the testing parameter may simulate a user selection of an option displayed by the UI control. The input parameter may simulate a user input into the UI control. The automated testing scenario may evaluate a response of the UI control to the testing parameter.

One or more automation test scenarios may be applied to a plurality of controls associated with a UI Map. The Data Sheet may identify the UI Map. For example, the Data Sheet may include a reference to the UI Map for each automation test scenario. A UI may be associated with a plurality of UI Maps. Each UI Map may describe a group of functionally or logically linked UI controls. The UI Map may include descriptive details, or metadata, associated with each UI control. Standard code may be written once to interpret and make use of those details. Typically no additional coding is required to automate test scenarios related to the group of controls described by the UI Map.

A UI Map may be an Excel spreadsheet. The UI Map may list UI controls involved in a test scenarios described in the Instruction Sheet.

An automation test scenario may determine a status of the UI control. For example, the scenario may determine whether the UI control exists, is disabled, is enabled within a module or component of the UI. The module may be a webpage, popup window, a table, or any other suitable component of a UI. The UI Map may group a group of UI controls that define the module. Descriptive details, or metadata, about each UI control stored in the UI Map may be used to initialize one or more members of the group of control under test.

The UI Map may include metadata for one or more UI control subject to an automation test scenario included in the Instruction Sheet. The metadata may be used to simulate a behavior of the UI control within the module. By storing the metadata in a UI Map, computer code implementing an automation test scenario may be configured to read and obtain information stored within a UI Map. The computer code implementing the automation test scenario may be reused for a plurality of UI Maps.

A UI Map may describe UI controls properties and roles, establish relationships between UI controls and define control with special roles. The relationships between UI controls may include relationships between UI controls in different UI modules.

For example, a UI Map may include a reference that maps a UI control under test to a QuickTest Professional ("QTP") (produced by Hewlett-Packard Co. of Palo Alto, Calif.) object repository ("ORPaths"). The object repository may be used to manipulate a UI control subject to an automation test scenario. Computer code that reads the UI map may invoke the object repository to implement an automation test scenario.

The UI Map may include a reference that maps a UI control under test details for working with the control using Descriptive Programming. The UI Map may include UI control settings that should be applied while executing the test scenario ("Settings"). The UI Map may include references to additional UI Maps related to the current one.

The metadata stored in a UI Map may be obtained from design documentation of a UI. The metadata may include the webpage or other UI module that utilizes the UI control under test. The metadata may include a name of a UI control. The name may identify the control within the UI module.

The metadata may include a control type associated with the UI control. The control type may correspond to a function of the UI control. Illustrative control types include web element, web list, web edit, web button, link, image, and web check box. Computer code implementing the automation test scenario may read the metadata stored within the UI Map and use the metadata to implement the automation test scenario.

The metadata may include a category associated with the UI control. Illustrative categories include static, dynamic, auxiliary, core, descriptive programming (control identified by description), message and/or label. The category of a control may be used to define a behavior of a control within a UI module. For example, a static control/column is expected always to be on the page/table.

The metadata may include a default value for a UI control on the webpage. The default value may be a property used to initialize a UI control. For example, a default value may be text, such as a label, displayed to a user within the UI control. The text may explain a functionality or purpose of the control. The default value may be a default option displayed by the UI control.

The metadata may include a reference to a second UI control triggered in response to user manipulation of a first UI control. For example, when a user of the UI clicks a first web button within a first UI module (e.g., on a first webpage), a popup may be displayed to the user. The displayed popup may correspond to a second UI module (e.g., a second webpage). The popup may be defined by its own UI Map. The popup may include the second UI control. The metadata associated with the first UI control may include a reference to the second UI Map and/or second UI control. Applying a testing scenario to the first control may verify that the second module is triggered in response to user manipulation of the first control.

The methods may include extracting information from the Instruction Sheet, Data Sheet and UI Map. The extracted information may be utilized by computer code that implements an automation test scenario. Computer code implementing an automation test scenario may be configured to read a UI Map. Computer code for implementing an automation test scenario may be utilized for a plurality of UI modules by reading the appropriate metadata for each UI module under test. An automation test scenario may be applied to UI controls described by a UI Map based on the metadata stored in the UI Map. For example, the metadata may be used to initialize the control as specified by the metadata. The metadata may define behavior of the control in response to simulated action applied to the UI control by the testing scenario.

Any change to an automation test scenario may be made by changing the metadata stored in the UI Map. UI Map based automation testing may reduce the amount of computer code needed to implement automation testing of a complete UI. Typically special computer coding skills would be needed to implement automation testing scenarios.

For example, coders would define individual class members for each UI Control together with related "Get and Set" functions. Each UI control would need to be individually "set" or linked to values in a dictionary of testing parameters. To verify, edit or act on a particular UI Control, separate code should be written to link it to a QTP Object Repository or Descriptive Programming element. The more controls under test, the more code should be written.

Popups may require separate code to handle them. Synchronization, verifying navigation and capturing messages need handling specific computer code would be written to implement an automation test scenario. Furthermore, a requisite level of coding skills would be needed to resolve a "bug" in an automation test scenario. To resolve the bug, code implementing the test scenario would be examined.

Utilizing UI Maps may reduce the amount of computer code needed to implement automation testing. Metadata associated with UI controls under test are stored in a spreadsheet as opposed to being incorporated into computer code. An automation test scenario may be written for a first UI control and utilized across a plurality of UI controls and UI modules. Each implementation of the automation test scenario may be configured to extract metadata from a specified UI map. Changing a metadata entry in a UI Map (e.g., a spreadsheet) may correspond to a change in the automation test scenario. Potentially, automation test scenario may be debugged by program developers without strong programming skills.

The methods of performing automation testing using a UI Map may include confirming a location of the first UI control on the webpage. An automation test scenario may be "reused" for a plurality of UI control and a plurality of UI modules. The methods may therefore include confirming that an automation test scenario is being applied to a UI control within a specific UI module. Each module of a UI may be associated with specific metadata in a corresponding UI Map.

The methods may include applying an automation test scenario to a UI control using one or more testing parameters extracted from the Data Sheet.

The methods may include designating a UI control as being compliant with metadata stored in the UI Map associated with the UI control. The UI control may be designated as "compliant" when the UI control responds to an automation test scenario as specified by the metadata.

A UI Map may a first UI Map. The first UI Map may include a link to a second UI Map. The first UI Map may include a temporal relationship between the UI control and the second UI Map. The automation testing scenario may verify the temporal relationship.

For example, the first UI Map may specify that when a user clicks a "Browse" button on a first popup window, a second popup (represented by the second UI Map) is displayed. The first UI Map may indicate that the second popup should appear after the user clicks on the Browse button, and that the user should wait no more than 10 seconds for it to appear. The automation test scenario may verify that the popup appears within 10 second of clicking the Browse button.

A first UI Map may include a first plurality of UI controls associated with a first module of the UI. The first module may be a webpage, a popup window, a table or any suitable UI module or component. A second UI Map may include a second plurality of controls associated with a second module of the UI. The second module may be a webpage, a popup window, a table or any suitable module.

The second UI Map may include metadata associated with each of the second plurality of controls. Further automation testing may be performed on the second plurality of controls using the metadata extracted from the second UI Map.

Applying an automation testing scenario to a UI control may include initializing creation of a class object using a two-part keyword. A first part of the keyword may initialize computer code that is configured to identify the UI Map and extract metadata from the UI Map. A second part of the keyword may initialize computer code corresponding to a specific automation test scenario to be applied to the UI controls listed in the UI Map.

The class object may be reusable for a plurality of different UI controls. The same class object may be configured to perform both a first automation test on a first UI control and a second automation test on the second UI control. The class object may be configured to retrieve first metadata from a first UI Map describing a first UI control. The class object may also be configured to retrieve second metadata from a second UI Map describing a second UI control. The first and/or second metadata may be altered by changing one or more fields of a UI Map. Any change to the metadata would not require a coding change to the class object or a change to other computer code used to implement an automation test scenario.

An automation testing scenario may be selected from a group that includes:
 Verifying an existence of a UI control on a webpage;
 Verifying an existence of a second UI control in response to a simulated user manipulation of a first UI control;
 Populating a UI control with test data;
 Applying a simulated user action to a UI control; and/or
 Populating a UI control with test data and applying the simulated user action to the UI control.

A UI control may implement a filtering function within a UI table. An automation testing scenario may initialize the filtering function using metadata stored in a UI Map. The automation test scenario may enter filtering data into the filter control. The filtering data may include filtering criteria used to filter contents of the UI table. The automaton test scenario may verify that a format of the filter criteria conforms to a predefined format expected by the filtering control. An automation testing scenario may include triggering the filter control. An automation testing scenario may include verifying that a UI table is filtered and/or displayed as specified by the filter criteria.

A UI control may implement a sorting function within a UI table. An automation testing scenario for the sorting function may include simulating a user click on the sorting UI control.

In response to the user click, a test scenario may verify that a sorting option is displayed to the user in response to the first click.

A test scenario may include simulating a user click on the displayed sorting option. In response to the user click on the sorting option, the testing scenario may verify that the UI table is sorted and displayed as specified by the "clicked" sorting option.

A Data Sheet may be a first Data Sheet associated with a first webpage of a UI. A testing parameter stored in the first Data Sheet may include a function call to computer code that, when executed by the processor, verifies that a first UI control exists on the first UI webpage described by the UI Map. A second Data Sheet may utilize the same function call referenced in the first Data Sheet to verify that a second UI control exists on a second UI webpage.

A testing parameter stored in a Data Sheet may include a function call to computer code that, when executed by a processor, verifies that a UI control exists and is enabled on a UI webpage. Metadata associated with the UI control (and extracted from a UI Map) may be used to locate within a UI module and initialize the UI control.

A testing parameter stored in a Data Sheet may include a function call to computer code that, when executed by the processor, simulates user manipulation of a UI control. The methods may include determining whether the UI control responds to the user manipulation as specified by the metadata.

Apparatus may include an article of manufacture comprising a non-transitory computer usable medium. The computer usable medium may have computer readable program code embodied therein. The computer code when executed by one or more processors configures a computer system to perform a method of software automation testing.

The method may include receiving a descriptive UI Map. The UI Map may include a UI control displayed by the software to a software user. The UI Map may include metadata associated with the UI control. The metadata may include a plurality of properties associated with the UI control. The UI Map may include a reference to a group of responsive UI controls activated by the software in response to an action applied by the software user to the UI control.

The method may include receiving an Instruction Sheet. The Instruction Sheet may include a function call to an automation testing scenario. The Instruction Sheet may include a reference to a Data Sheet. The method may include receiving the Data Sheet. The Data Sheet may include a user action expected by the UI control. The user action may be a mouse click or any other suitable user action. The Data Sheet may include an expected status of the group of responsive UI controls in response to applying the user action to the UI control.

The method may include executing the function call and simulating the user action. In response to simulating an application of the user action to a UI control, the method may include determining whether the UI control exhibits the plurality of properties described in a UI Map. In response to simulating the applying of the user action to the UI control, the method may include determining whether a reaction of the group of responsive UI controls conforms to the expected status.

A descriptive UI Map may include a temporal limit associated with the group of responsive UI controls. In response to simulating the applying of the user action to the UI control, the method may include determining whether the group of responsive UI controls is activated by the software within the temporal limit.

A descriptive UI Map may be a first descriptive UI Map. The first descriptive UI Map may link a UI control to a second descriptive UI Map. The second UI Map may be associated with the group of UI controls. The second UI Map may include metadata/properties associated with the group of UI controls. The UI control may be a web button. The group of responsive UI controls may be displayed by the software in a popup window.

In response to simulating the applying of the user action to the UI control, the method may include initializing the group of responsive UI controls based on metadata stored within the second UI Map. In response to simulating the applying of the user action to the UI control, the method may include evaluating whether the group of responsive UI controls is displayed in conformance with at least one property included in the second descriptive UI Map.

Apparatus may include an article of manufacture comprising a non-transitory computer usable medium. The non-transitory medium may have computer readable program code embodied therein. The code when executed by one or more processors configures a computer system to execute a method of performing automation testing on a software application. The software application may be a UI application or any suitable software application.

The method may include retrieving a UI Map describing a module of the software application. The module may be a webpage or other suitable software component. The UI Map may include a plurality of controls that are designed to be operational with one another on a webpage generated by the software application. The UI Map may include metadata associated with each of the plurality of controls. The metadata may include a plurality of properties associated with at least one of the plurality of UI controls.

The method may include retrieving an Instructions Sheet. The Instruction Sheet may include at least one of a plurality of functions for applying to the at least one of the plurality of UI controls. The Instruction Sheet may include an expected result of applying the at least one function to the at least one UI control.

The method may include retrieving a Data Sheet. The Data Sheet may include a test parameter such as a test input utilized by the at least one function specified in the Instruction Sheet. The method may include producing an instance of the at least one control using the plurality of properties. The method may include applying the at least one function to the instance of the at least one control using the test input.

The method may include certifying that a UI control is compliant with a design of the software application. The UI control may be certified when a result of the applying the at least one function to the at least one control using the test input conforms to the expected result.

The plurality of functions within the Instruction Sheet may include:
  Sorting at least a portion of a table filtering at least a portion of the table;
  Expanding a cell of the table; and/or
  Collapsing the cell of the table.

The plurality of functions within the Instruction Sheet may include:
  Verifying that the at least one UI control is located on the webpage generated by the software application;
  Entering the test input into the instance of the at least one UI control;
  Simulating a user action that triggers a reaction from the instance of the at least one UI control; and/or Entering the test input data into the instance of the at least one UI control, and then, registering the input data with the software application.

The computer code stored on the non-transitory medium may be configured to implement one or more of the plurality of functions stored in the Instruction Sheet. To implement one or more plurality of functions for a particular UI control, the computer code may retrieve one or more properties stored in the UI Map and associated with the particular UI control.

A UI Map may be a first UI Map. A plurality of UI controls may be a first plurality. A webpage may be a first webpage. A test input may be a first test input. A result may be a first result. An expected result may be a first expected result. The method may include triggering a second plurality of UI controls associated with a second UI Map by applying the at least one function to the instance of the at least one UI control using the test input. For example, the second plurality of UI controls may be a popup window or a sorted/filtered table.

The method may include producing an instance of the at least one of the second plurality of UI controls using a second plurality of properties stored in a second UI Map. The method may include applying at least one of the plurality of functions to the instance of the at least one of the second plurality of UI controls using a second test input. The second test input may be stored in a second Data Sheet. The second Data Sheet may be associated with the second UI Map.

The methods may include certifying the second plurality of UI controls as being compliant with the design of the software application. The second plurality of controls may be certified when a second result of applying the function to the at least one of the second plurality of controls (using the second test input and second UI Map) conforms to a second expected result. The second expected result may be stored in an Instruction Sheet associated with the second Map.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to create UI Maps, create Data Sheets, create Instruction Sheets, implement automation testing procedures and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
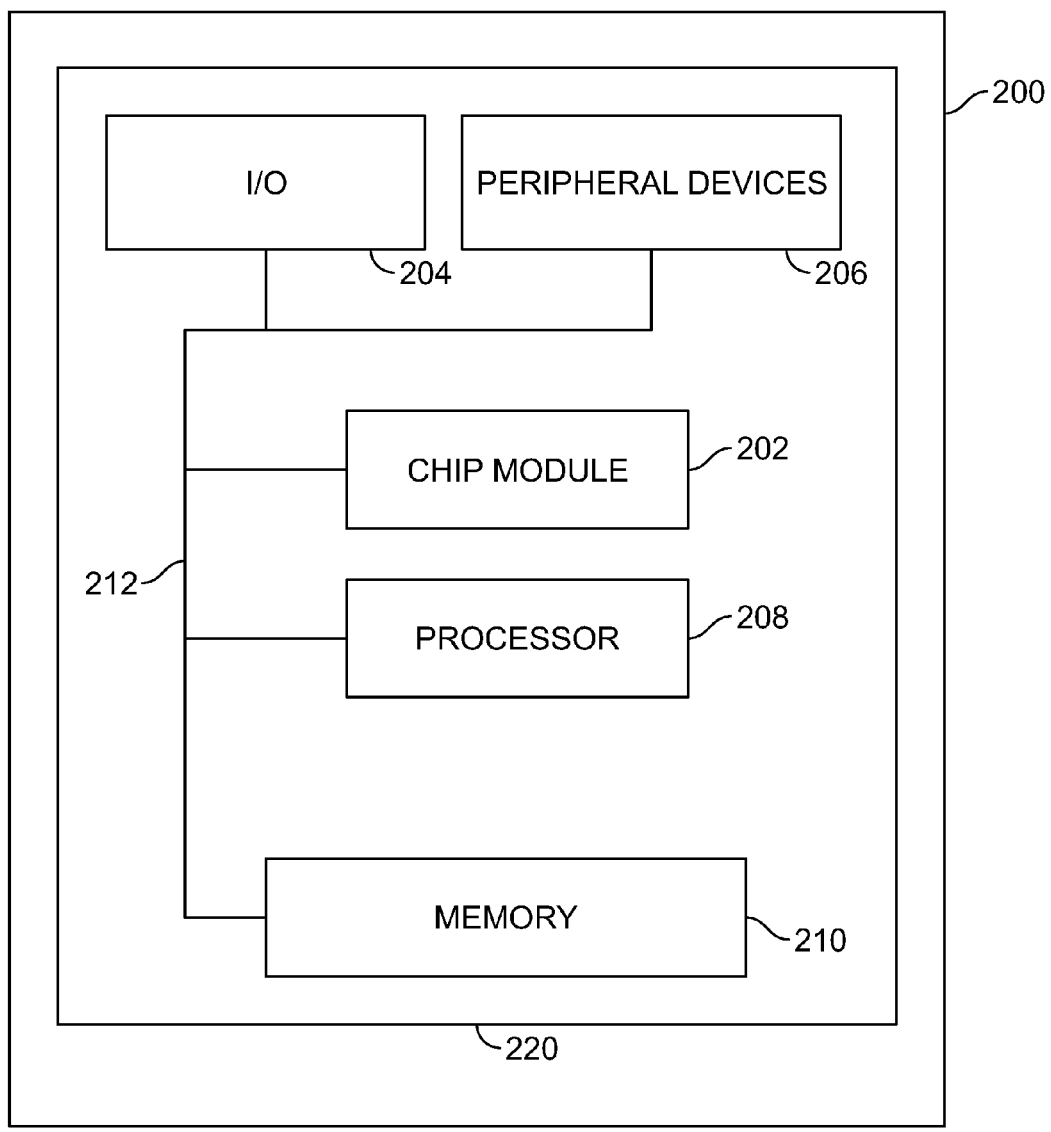
FIG. 2 shows an illustrative apparatus in accordance with principles of the invention.

FIG. 2 shows an illustrative apparatus 200 that may be configured in accordance with the principles of the invention. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: exception reports, rules tables, lexical items tables, computer code and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
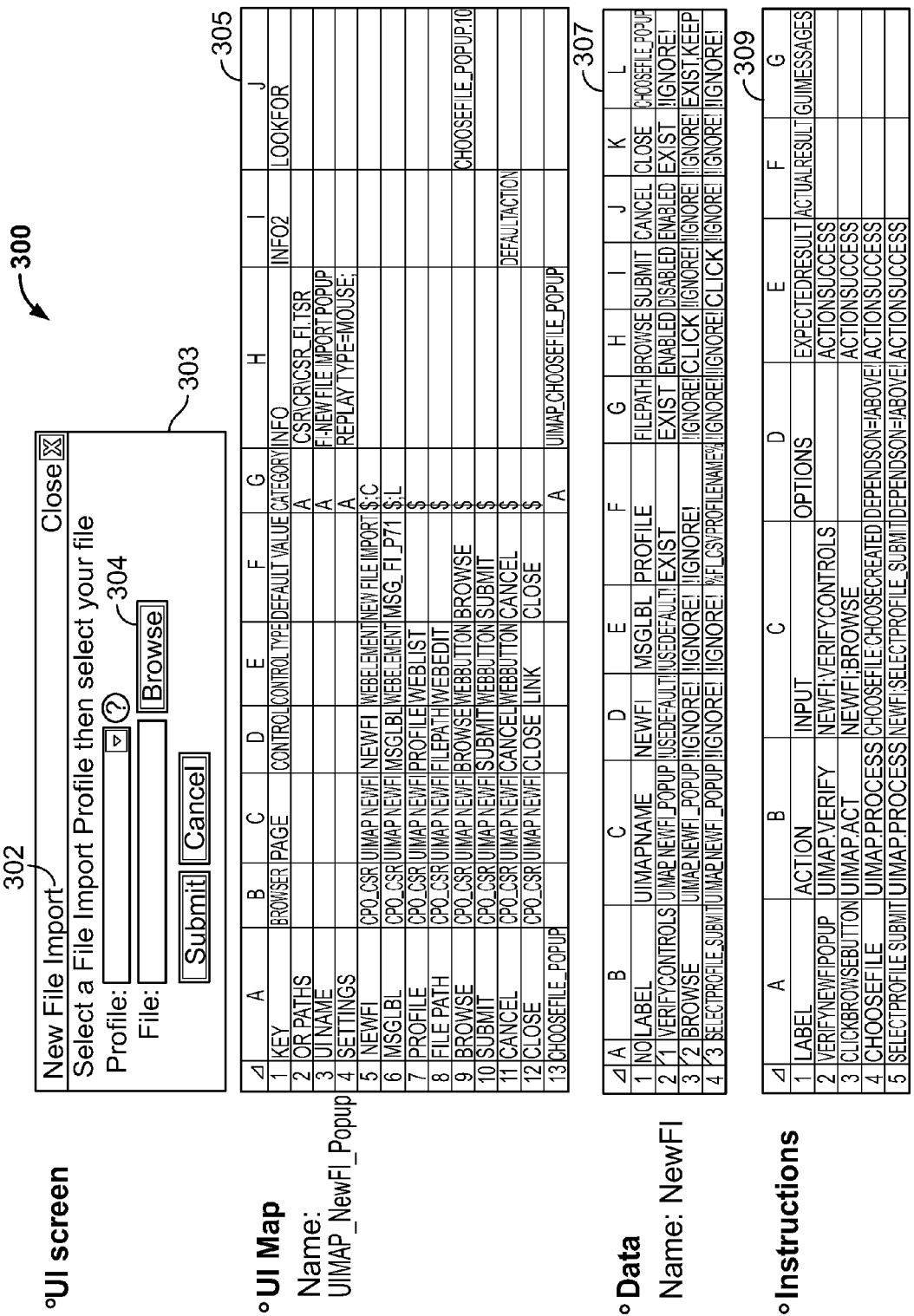
FIG. 3 shows illustrative components in accordance with principles of the invention.

FIG. 3 shows illustrative information 300. Information 300 may be used to implement UI Map automation testing. Information 300 includes exemplary UI screen 303. Screen 303 includes a plurality of UI controls. Each control included in screen 303 is associated with one or more properties described in UI Map 305.

The properties may be automation attributes, or metadata, associated with each control. UI Map 305 includes rows 1-4 that provided information, such as ORPaths row (which QTP object repository should be used), Settings row (settings that should be applied while executing related test scripts) and references to other UI Maps related to UI Map 305 (ChooseFile_Popup in this particular case).

In column A, rows 5-13 UI Map 305 includes a listing of UI controls that implement screen 303. UI Map 305 includes columns B-E ("Browser," "Page," "Control" and "Control-Type"). Columns B-E may provide details for working with the UI controls listed in rows 5-13 through using Descriptive Programming. Information included in each of columns B-E may allow a mapping of a UI control specified in column A, rows 5-13 to a QTP object repository hierarchy. "Descriptive programming" may mark a UI control that is not included in an object repository ("OR") and is therefore identified by description.

Column F ("DefaultValue") of UI Map 305 contains default values for each UI control. Columns H and I ("Info" and "Info2") may include additional information, such as an override action that may be utilized for a specified UI control.

Column G ("Category") includes one or more of the following illustrative categories for each UI control:
S—static
D—dynamic
A—auxiliary
C—core
P—descriptive programming
M—message
L—label A "static" UI control/column is always expected to be present on a page/table. A "dynamic" UI control/column is conditional and may not be present on a page/table. A dynamic UI control/column may be present on a page/table in response to user action. In a preferred embodiment, for static and dynamic controls, the browser, page, control, control type fields (columns B-E of UI Map 305) are expected to be completed. An "auxiliary" entry may not include a description for each of Browser, Page, and Control fields. Exemplary auxiliary entries for a UI Map may include: UIName, ORPaths, Ref_name, columnName_Col and columnName_TEL (for UI table controls).

A "core" control is an anchor UI control that may be used to identify a page or other component of a UI. In a preferred embodiment, if a core control is not provided in a UI Map, all static UI controls are used to identify the UI page. Page identification may be performed as a first step in automation testing. Page identification may confirm that an automation testing scenario is being applied to the correct UI control within a UI page.

A "Message" category marks messages that might appear after an action (by user or system) on the UI page is performed. A "Label" category marks a UI control that cannot be filled or acted upon and is presented for informational purposes.

Column J, ("LookFor") shows UI controls or groups of UI controls (represented by a separate UI Map(s)) that may be initialized after performing some action on the current UI control. Column J also allows for specifying time needed for synchronization. For example, in UI Map 305, "ChooseFile_Popup.10" is specified for the "Browse" button (row 9). "ChooseFile_Popup.10" refers (through the corresponding Auxiliary ChooseFile_Popup entry (row 13) in UI Map 305) to another popup (a group of UI controls) represented by UIMAP_ChooseFile_Popup. The UI Map for UIMAP_ChooseFile_Popup is not shown in FIG. 3. UI Map 305 indicates us that the ChooseFile_Popup UI control appears after a user clicks on the Browse button, and that an automation test scenario should wait no more than 10 seconds for the popup to appear.

As a specific example, UI Map 305 in row 5 lists a "NEWFI" control. Column F of UI Map 305 shows that a default value for the NEWFI control is "New File Import." The default value is displayed at position 302 within screen 303. Column G of UI Map 305 shows that the NEWFI control is a core UI control that may be used to identify screen 303 and a webpage that includes screen 303.

UI Map 305 includes properties for "browse" UI control 304 in row 9. For example, in column J, UI Map 305 shows that when a user clicks, or otherwise selects, the browse UI control, a popup window is expected to appear and the popup should appear within 10 seconds of the click. In rows 5-12, UI Map 305 shows additional UI controls that are included in screen 303. In columns B-J, UI Map 305 shows properties associated with each of the UI controls in rows 5-12. Each row of a UI Map may include a UI control and corresponding property of the UI control.

Each UI Map may define a UI module. UI Controls included in a UI Map may be related to one or more UI modules. For example, a UI control may link to another UI page. A distinct UI Map may be associated with the other UI page. A UI Map that includes the UI control may include an entry linking the UI control to the UI Map associated with the other UI page.

A UI Map may also include other information associated with a UI module. For example, in rows 2-4, UI Map 305 includes other important information, like what object repository should be used (row 2, "ORPaths"), what settings may be applied while executing related test scripts (row 4, "Settings") and references to other UI Maps related to the current one (row 13, "ChooseFile_Popup" in this particular UI Map).

Information 300 includes Data Sheet 307. Data Sheet 307 includes test parameters. An automation test scenario may pass the test parameters to one or more of the controls of screen 303. An automation testing function may be utilized the test parameters to simulate a reaction of the controls of screen 303. Columns C-L of Data Sheet 307 list exemplary controls within screen 303 that may be subject to the testing operation listed in column B of Data Sheet 307. For example, in row 1, Data Sheet 307 includes a "VERIFYCONTROLS" test. The VERIFYCONTROLS test is applied to various controls (row 1, columns D-L of Data Sheet 307) listed in UI Map 305.

For each control, the VERIFYCONTROLS test is associated with a test parameter shown in row 2, columns D-L of Data Sheet 307). The test parameters represent an expected value or property of a UI control for a particular automation test.

Data Sheet 307 shows that for the UI control "NEWFI" (column D), a "!USEDEFAULT!" test parameter will be passed to the VERIFYCONTOLS test. The "!USEDE-FAULT!" parameter is a predefined value that may be obtained from the "DefaultValue" field value in UI Map 305 (row 5, column F). In this example, the DefaultValue is "New File Import." As indicated in UI Map 305 (row 5, column E) NEWFI is a WebElement (an informational item) that identifies the UI controls associated with screen 303. The VERIFYCONTROLS test is configured to verify that screen 303 displays the title "New File Import" when presented to a user.

Data Sheet 307 also includes the following illustrative tests. For each test, a data dictionary is created. The data dictionary includes properties for each UI control described in UI Map 305. An automation test scenario applied to a UI control extracts the data value associated with the UI control from the data dictionary and performs the requested test.

For MSGLBL (a message text) WebElement (as indicated in UI Map 305 row 6, column E) the corresponding input parameter is also "!USEDEFAULT!." An input to the VERIFYCONTROL test for MSGLBL value is taken from the corresponding "DefaultValue" field shown in UI Map 305 (row 6, column F). The DefaultValue is "Msg_FI_P71." The value "Msg_FI_P71" represents a Message ID or MsgKey used to find the corresponding message for display to a user. The corresponding message may be stored in a central Message List.

For PROFILE (a dropdown list) Web List (as indicated in UI Map 305 row 7, column E), a corresponding test parameter entry is "Exist." Upon execution of program code implementing the VERIFYCONTROLS test, it is verified that the PROFILE control exists (i.e., is displayed) within screen 303.

For BROWSE (a control button) Web Button (as indicated in UI Map 305 row 9, column E) the corresponding test parameter is "Enabled" (Data Sheet 307 row 1, column H). Upon execution, the VERIFYCONTROLS test will execute computer code that verifies that the BROWSE control exists within screen 303 and is enabled when presented within screen 303.

For SUBMIT (a control button) Web Button (as indicated in UI Map 305 row 10, column E) the test parameter for the VERIFYCONTROLS test is "Disabled" (Data Sheet 307 row 1, column I). Upon execution, the VERIFY-CONTROLS test will execute computer code that verifies that the SUBMIT control exists and is disabled when presented within screen 303. A user may need to click or take other action to enable the SUBMIT Web Button.

For CANCEL (a control button) Web Button (as indicated in UI Map 305 row 11, column E) the corresponding test parameter is "Enabled" (Data Sheet 307 row 1, column J). Upon execution, the VERIFYCONTROLS test will execute computer code that verifies that the CANCEL control exists and is enabled when presented within screen 303.

Similarly, any automation testing scenario may be applied to various UI controls by identifying and processing the corresponding test parameter(s) listed in a UI Map. Using disclosed apparatus and methods, automation testing may be performed without writing any specific code for a unique combination of controls. Code may be written once for a particular control or group of controls. Based on design documentation associated with the control or group of controls, a UI Map may be constructed. The test parameters associated from each control may be extracted from the design documentation. Various automation test functions may be applied to the control or group of controls using the extracted test parameters. Computer code implementing the test functions may be written once and reused as needed (i.e., for multiple UI controls or multiple AUTs).

FIG. 3 includes Instruction Sheet 309. Instruction Sheet 309 specifies illustrative testing steps or scenario that may be taken to implement a particular automation test. Each row in Instruction Sheet 309 corresponds to a particular automation test performed on a UI control or group of UI controls. An automation test may iteratively call computer code or functions to implement the testing scenario described in each row of Instruction Sheet 309.

For example, Instruction Sheet 309 (row 2, column A) includes an automation test labeled "VerifyNewFIPopup." The test VerifyNewFIPopup is associated with test parameters in column C ("Input") for this particular automation test. For VerifyNewFIPopup, Instruction Sheet 309 points to "VerifyControls" in row 2 of "NewFI" Data Sheet 307. For each UI control tested by VerifyNewFIPopup, test parameters are extracted from row 2 of NewFI Data Sheet 307.

In a preferred embodiment, extracted test parameters are stored in the data dictionary using the column names displayed in row 1 of Data Sheet 307 as keys. Thus, the data dictionary may include keys corresponding to "NEWFI," "MSGLBL," "PROFILE" and other controls included in UI Map 305 and listed in row 1 of Data Sheet 307.

Instruction Sheet 309 (row 2, column B) includes an action to be taken by the VerifyNewFIPopup test. In this example, the action corresponds to "UIMAP.VERIFY." UIMAP.VERIFY includes two functions. Each of the two functions may be described as a "keyword." Each keyword corresponds to computer code to be executed. The computer code may be a stand-alone function for the keyword or may be a part of a function shared by several keywords.

The first keyword included in UIMAP.VERIFY is the "UIMAP" keyword. UIMAP initializes creation of a UI Map class object. The name of the UI Map class object is extracted from Data Sheet 307 using a predefined "UIMapName" key. In this example, the name of the UI Map class object is "UIMap_NewFI_Popup," as shown in row 2, column C of Data Sheet 306. Invoking a UI Map class object creates a UI Map "data dictionary," or data set, that includes the properties or metadata associated with each UI control described in UI Map 305.

The data dictionary is used to location the UI control under test within the UI. The data dictionary is used to initialize the UI control so that a test parameter may be applied to the UI control.

The second keyword included in UIMAP.VERIFY is a "Verify" keyword. "Verify" corresponds to a function of created UI Map class object that will be applied to one or more UI controls. The Verify function iterates through each of the controls listed in UI Map 305 and extracts the corresponding test parameters from Data Sheet 307 that are associated with the controls included in UI Map 305. The Verify function may apply to the extracted test parameters to each UI control. The Verify function thus performs an automation test scenario that verifies controls listed in Data Sheet 307, row 1, columns D-L using the test parameters associated with those controls in row 2 columns D-L of Data Sheet 307.

Once a UI control or function is defined in a UI Map, no additional computer code is needed to perform automation testing of the UI control. "Standard" UI Map class objects may be invoked for commonly used controls (i.e., UIMap.Verify, UIMap.Fill, UIMap.Act and UIMap.Process).

FIG. 4 shows illustrative UI Map 401. UI Map 401 describes illustrative UI controls for table that may be included in a UI. Automation testing for a UI table is typically a very laborious coding task. Utilizing a "UI Table" class may extend the UI Maps approach to UI table controls. Each "table" UI Map 401 may be associated with a Data Sheet and Instruction Sheet (not shown).

UI Table controls may include filtering, sorting and selection related controls. Utilizing a UI Table class, coding to implement automation testing for a UI table may be reduced for the following illustrative tasks:
  Filtering and Sorting of various columns.
  Searching for rows based on their content.
  Verifying table/rows/cells content.
  Editing table elements and acting on them.
  Rows selection, expansion or deletion.
  Flexible adjustment to internal tables using plugins.

UI Map 401 includes visibility helper 403. Visibility helper 403 may determine how an AUT has implemented visibility/invisibility of rows/columns of a presented table. The visibility helper may invoke various functions to identify the visibility/invisibility technique utilized within the AUT.

FIG. 5 shows illustrative data template 500. Data template 500 may be used to enforce data standards during automation testing. For example, data template 500 specifies that test input parameters are expected in <State>;<Value> format. Predefined state options and values for the state options are shown in data template 500 for each listed control.

FIG. 6A shows illustrative UI Table 601. FIG. 6B shows illustrative UI Map 603 for a portion of the UI controls included in UI Table 601. For example, UI Table includes "Clear Filters" UI control 605. "Clear Filters" UI control 605 corresponds to entry 607 in UI Map 603. Columns of UI Map 603 include metadata associated with "Clear Filters" UI control 605.

For example, column 609 of UI Map 603 associates UI Control 605 with an Object Repository. The object repository may include computer code for initializing and manipulating UI control 605. Column 611 associates UI control 605 with webpage of a UI. Multiple instances of a control may appear on different UI webpages. For example, a UI may include multiple tables that each include a "Clear Filters" UI control. To ensure that a UI control is functioning as expected with respect on a specific UI webpage, an automation test scenario must verify that it is testing the UI control on the specific webpage.

Column 613 associates the UI control with a name or label. Column 615 specifies a control type associated with the UI control. Column 617 specifies a category for each UI control. UI Map 603 is utilized to locate and initialize a UI control within UI Table when an automation testing scenario refers to the UI control.

FIG. 7 shows illustrative Instruction Sheet 701. FIG. 7 shows illustrative Data Sheet 703. Instruction Sheet 701 and Data Sheet 703 may be used to implement an automation test scenario for a "Filter" function within a UI table. In column 709, Instruction Sheet 701 includes a two-part keyword "UITable.Filter". The command UITable.Filter initiates a UI Table class object and invokes a "Filter" function of the object. In column 711, Instruction sheet 701 identifies Data Sheet labeled "RPP." Data Sheet 703 is labeled "RPP."

Column 711 of Instruction Sheet 701 specifies the "FilterAndVerify" row of Data Sheet 703. The "FilterAndVerify" row includes testing parameters for UI controls included in the UI Table. Metadata associated with each of the UI controls included in the UI table may be stored in a UI Map (not shown).

For example, an automation test scenario may test operation of a filtering function of a UI Table. A first step of the automation test may invoke a "ClearFilters" control to reset the UI Table. Data Sheet 703 shows that when Instruction Sheet 701 includes a function call to "FilterAndVerify", Data Sheet 703 specifies that a "click" should be applied to "ClearFilters" control 713. Metadata stored in a UI Map may define one or more properties of the "ClearFilters" control. The metadata may be used to initialize the "ClearFilters" control. The metadata may be used to verify that the "ClearFilters" control functions as designed in response to the "click."

Data Sheet 703 shows that "CheckNumber_Filter" UI control 715 expects an input having the format "% CheckNumber %." "% CheckNumber %" may refer to a specific stored format. Illustrative formats are shown above in FIG. 5. For example, the stored format may require that, to filter a table of checks based on a check number, the check number must be of the format "xxxx" where each "x" is a number between 0-9. Data Sheet 703 shows that when "CheckNumber_Filter" 715 receives a test parameter, we perform the "Verify" function to ensure that the items displayed by the UI table met the criteria of the test parameter.

FIG. 8 shows illustrative Instruction Sheet 801 and Data Sheet 803. Instruction Sheet 801 and Data Sheet 803 may be used to implement an automation test scenario that verifies operation of a "Sort" UI control within a UI table. In column 809, Instruction Sheet 801 includes a two-part keyword call to "UITable.Sort". The command UITable.Sort initiates a UI Table class object and invokes a sorting function of the object. In column 807, Instruction Sheet 801 identifies Data Sheet labeled "SRSort." Data Sheet 803 is labeled "SRSort."

Column 807 of Instruction Sheet 801 identifies two types of automation testing scenarios: sorting the UI table in ascending order ("SortAsc") and sorting the UI table in descending order ("SortDesc").

For "SortAsc," row 813 of Data Sheet 803 specifies testing parameters for various UI controls included in UI Map "UI_Map_RRP." Testing parameters for "SortDesc" are specified in row 815 of Data Sheet 803. UI_Map "UI_Map_RRP" 816 may include metadata associated with UI controls "AccountNumber_Sort" 817, AccountName_Sort" 819, "CheckNumber_Sort" 821 and "Amount_Sort" 823. Each of the sorting UI controls may implement a different type of sorting functionality for the UI Table.

Each of the sorting UI controls may be associated with metadata stored in "UI_Map_RRP." For example, "UI_Map_RRP" 816 may describe a control type for each of the sorting UI controls. The automation testing scenario may initialize a sorting UI control based on the metadata in UI Map "UI_Map_RRP" 816. The automation testing scenario may verify that a sorting UI control performs as described by the metadata stored in UI_Map "UI_Map_RRP" 816.

For example, for the sorting UI control "AccountNumber_Sort" 817 an automation test scenario may verify that "AccountNumber_Sort" control 817 correctly sorts rows of a UI Table based on a numerical order (ascending or descending) of "account numbers." The automation test scenario may also verify that, after the UI Table is sorted based on account number (a primary column), the UI Table is further sorted based on an "amount" column (a secondary column).

Figure 9A:
FIGS. 9A and 9B show illustrative components in accordance with principles of the invention.

FIG. 9A shows illustrative UI Table 901 that may be displayed to a user. UI Table 901 shows a plurality of checks numbers 905 that have been submitted for deposit against account numbers 907. UI Table 901 shows that a user may select a return reason 903 to "return" or recoup a payment of one of check numbers 905. An automation testing scenario may verify that a functionality of the return reason column 903 before UI Table is deployed.

Figure 9B:

FIG. 9B shows illustrative Instruction Sheet 909 and Data Sheet 911 that may be used to test the functionality of return reason 903. An automation test scenario may confirm that a user selection of a "Return—Fraud value" option (not shown) from a drop down list below Return Reason column 903 may only be selected for a check number associate with a "Paid" status. Checks that have not yet been paid may be "stopped." Checks that have already been paid may be "returned."

As first step, the automation testing scenario may use a two-part UITable.VerifyTE keyword to invoke a VerifyTE function of a UI Table class object. The VerifyTE function may search for a row in UI Table 901 associated with a "Paid" status. Instruction Sheet 909 shows that a row labeled "SearchByStatus" within a Data Sheet labeled "RPP" includes the testing parameters for the test scenario. The test scenario may input a testing parameter corresponding to "Paid" into a UI control "Status_Search." The UI control "Status_Search" may be associated with metadata stored in UIMap_RPP. The metadata may be used to locate and initialize a functionality of the "Status_Search" UI control within the UI table. The metadata may define the functionality or behavior of the "Status_Search" UI control within the UI table.

After finding at least one check number in the UI table that includes a "Paid" status, the automation testing scenario may save the check number in global variable % CheckNumber %.

In the second row of Data Sheet 911, the automation testing scenario may use the UITable.FillTE keyword to invoke a FillTE function to input or "fill" the check number stored in % CheckNumber % into the "CheckNumber_Search" UI control. Next, the automation testing scenario may, for the row of the UI table 903 that includes the check number stored in % CheckNumber %, select "Return-Fraud" from the drop down list of the ReturnReason_TE UI control.

UI controls ReturnReason_TE and CheckNumber_Search may be initialized during the automation test scenario using the metadata associated with each of the UI controls in UIMap_RPP. For example, to verify, edit or act on a particular UI Control, a function call to the corresponding a UI_Map class function is needed. The corresponding UI Map generated by the function call links the UI control under test to an Object Repository or Descriptive Programming element. The UI control may be initialized using either the Object Repository or Descriptive Programming element. Once initialized, the automation test scenario may feed test parameters such as % CheckNumber % or "Return-Fraud" into the UI control under test.

Thus, methods and apparatus for automation testing using descriptive maps have been provided. Persons skilled in the art will appreciate that the present invention can be practiced by other than the described embodiments, which are presented for purposes of illustration rather than of limitation. The present invention is limited only by the claims that follow.

What is claimed is:

1. An article of manufacture comprising:
a non-transitory machine readable memory having computer readable program code embodied therein;
one or more processors configured to execute the computer readable program code; and
a system bus configured to transfer the computer readable program code from the machine readable memory to the processor;
the code when executed by the one or more processors, performs a method for automation testing of a webpage of a User Interface ("UI"), the method comprising:
receiving an Instruction Sheet comprising:
an automation test scenario; and
a reference to a Data Sheet;
extracting from the Data Sheet:
a reference to a first UI Map; and
a testing parameter for a first UI control;
extracting, from the first UI Map, metadata associated with the first UI control, the metadata comprising:
the webpage that comprises the first UI control;
a name of the first UI control;
a control type associated with the first UI control on the webpage;
a category associated with the first UI control on the webpage;
a default value for the first UI control on the webpage; and
a reference to a second UI control triggered in response to user manipulation of the first UI control;
initializing the first UI control based on the metadata;
applying the automation test scenario to the first UI control using the testing parameter; and
in response to applying the automation test scenario the first UI control, initializing the second UI control based on a second UI Map associated with the second UI control;
wherein:
the applying of the automation test scenario comprises initializing a class object using a two-part keyword;

a first part of the keyword initializes computer code that is configured to:
   identify the first UI Map; and
   extract the metadata from the first UI Map; and
a second part of the keyword initializes computer code that is configured to execute the automation test scenario using the testing parameter.

2. The article of claim 1, the method further comprising designating the first UI control as being compliant with the metadata when the first UI control responds to the applying of the automation test scenario as specified by the metadata.

3. The article of claim 1 wherein the first UI Map comprises:
   a link to a second UI Map; and
   a temporal relationship between the UI control and the second UI Map; and
   the automation test scenario verifies the temporal relationship.

4. The article of claim 3, wherein the first UI Map comprises a first plurality of UI controls associated with a first webpage of the UI and the second UI Map comprises a second plurality of UI controls associated with a second webpage of the UI.

5. The article of claim 1 wherein the class object is used to perform a first automation test on the first UI control and a second automation test on the second UI control.

6. The article of claim 1 wherein the automation test scenario is selected from a group comprising:
   verifying an existence of the first UI control on the webpage;
   verifying an existence of the second UI control in response to a simulated user manipulation of the first UI control;
   populating the first UI control with test data;
   applying a simulated user action to the first UI control; and
   populating the first UI control with test data and applying the simulated user action to the first UI control.

7. The article of claim 1 wherein, when the first UI control implements a filtering function within a UI table, the automation test scenario comprises:
   entering filter data into the filter control;
   verifying a format of the filter data;
   triggering the filter control; and
   verifying that the UI table is displayed as specified in the filter data.

8. The article of claim 1 wherein, when the first UI control implements a sorting function within a UI table, the automation test scenario comprises:
   simulating a first user click on the sort control;
   verifying a display of a sorting option in response to the first user click;
   simulating a second user click on the sorting option; and
   verifying that the UI table is displayed as specified in the sorting option.

9. The article of claim 1 wherein the testing parameter stored in the Data Sheet is a reference to a property of the first UI control stored in the first UI Map.

10. The article of claim 1 wherein when the Data Sheet is a first Data Sheet and the webpage is a first webpage:
   the testing parameter stored in the first Data Sheet comprises a function call to computer code that, when executed by the one or more processors, verifies that the first UI control exists on the first UI webpage described by the first UI Map; and
   the second Data Sheet utilizes the function call to verify that the second UI control exists on a second UI webpage.

11. The article of claim 1 wherein the testing parameter stored in the Data Sheet comprises a function call to computer code that, when executed by the one or more processors, simulates the user manipulation of the first UI control, and the method further comprises determining whether the first UI control responds to the user manipulation as specified by the metadata.

* * * * *